United States Patent
Crist et al.

(10) Patent No.: US 7,669,532 B2
(45) Date of Patent: Mar. 2, 2010

(54) METHODS AND APPARATUSES FOR PROJECTILE FUZE SETBACK GENERATOR POWER SOURCE AND PROJECTILES INCLUDING SAME

(75) Inventors: Scott D. Crist, Naples, FL (US); Mark J. Tomes, Mesa, AZ (US); Hossein Aliaghai, Plymouth, MN (US); Erik J. Elmer, Minneapolis, MN (US)

(73) Assignee: Alliant Techsystems Inc., Minneapolis, MN (US)

( * ) Notice: Subject to any disclaimer, the term of this patent is extended or adjusted under 35 U.S.C. 154(b) by 136 days.

(21) Appl. No.: 11/560,991

(22) Filed: Nov. 17, 2006

(65) Prior Publication Data

US 2008/0115686 A1    May 22, 2008

(51) Int. Cl.
*F42C 11/04* (2006.01)
*H02K 35/02* (2006.01)
*H02K 39/00* (2006.01)

(52) U.S. Cl. .................................. 102/209; 310/12.12
(58) Field of Classification Search ................. 102/207, 102/209; 310/12, 13, 14, 12.12
See application file for complete search history.

(56) References Cited

U.S. PATENT DOCUMENTS

| | | | | |
|---|---|---|---|---|
| 2,369,337 A | * | 2/1945 | Cahill | 102/257 |
| 2,655,867 A | * | 10/1953 | Jordan | 102/209 |
| 2,703,530 A | * | 3/1955 | McGee | 102/209 |
| 2,820,411 A | * | 1/1958 | Park | 102/209 |
| 2,825,863 A | * | 3/1958 | Krupen | 102/209 |
| 3,034,437 A | * | 5/1962 | Schermer et al. | 102/209 |
| 3,035,520 A | * | 5/1962 | Koeppen | 102/209 |
| 3,259,769 A | * | 7/1966 | Stott | 310/14 |
| 3,981,245 A | | 9/1976 | Buzzell et al. | |
| 4,091,733 A | | 5/1978 | Ziemba | |
| 4,603,635 A | | 8/1986 | Boudreau | |
| 5,101,470 A | | 3/1992 | Reynolds | |
| 5,271,327 A | | 12/1993 | Filo et al. | |
| 5,343,795 A | | 9/1994 | Ziemba et al. | |
| 6,847,132 B2 | | 1/2005 | Ukaji | |

* cited by examiner

*Primary Examiner*—Bret Hayes
(74) *Attorney, Agent, or Firm*—TraskBritt (57) ABSTRACT

Projectile fuze setback generator power source apparatuses and methods of use and manufacture are disclosed. An explosive projectile contains a fuze with a setback generator and associated fuze electronics. Upon initiation of projectile launch, the setback generator produces a voltage for use by the fuze electronics during flight. The setback generator includes a magnet maintained in place within a surrounding coil by a fastener. When a projectile is fired, rapid acceleration thereof causes the fastener to break and the magnet to be displaced longitudinally within the surrounding coil, which decreases the magnetic field and induces a current in the surrounding coil. The induced current produces a voltage that is stored in a capacitor operably coupled to the setback generators which then is used to power the fuze electronics during flight.

34 Claims, 6 Drawing Sheets

METHODS AND APPARATUSES FOR PROJECTILE FUZE SETBACK GENERATOR POWER SOURCE AND PROJECTILES INCLUDING SAME

FIELD OF THE INVENTION

This invention, in various embodiments, relates generally to fuzes for projectile-type explosive devices and, more specifically, to apparatuses and methods for an improved setback generator power source used with projectile fuzing electronics.

BACKGROUND OF THE INVENTION

State of the Art: Electronic fuzing systems for controlling projectile warheads are well known in the art. Conventionally, projectile fuzes contain either a setback generator or a reserve battery to provide power to the fuze electronics during flight. Fuze electronics may include controllers, timing circuitry, and various sensors. Additionally, the fuze electronics may include a safing and arming module to ensure that both the arming and detonation of the projectile occur only at a desired moment.

Figure 1:
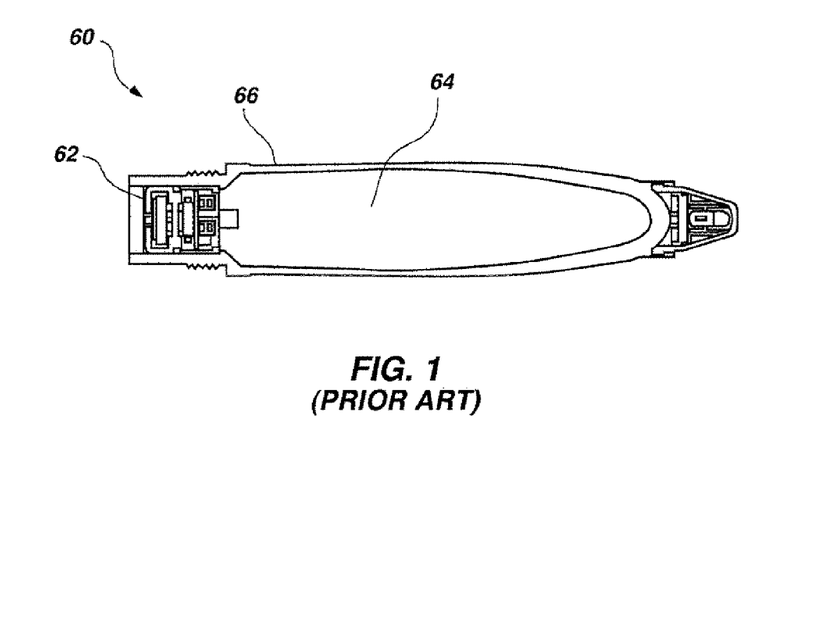
FIG. 1 is an illustration of a conventional explosive projectile containing a fuze.

FIG. 1 illustrates a conventional explosive projectile 60 (also referred to as a warhead). As illustrated in FIG. 1, the explosive projectile 60 includes a fuze 62 and an explosive material 64 encased by a body 66. Fuze 62 may comprise, among other parts, a faze electronics module, a power source, and a safing and arming module.

Reserve batteries, which have commonly been used as a power source for fuze electronics, may include a glass ampoule with electrolytes contained therein. Upon projectile launch, ideally the glass ampoule breaks and the electrolytic fluid flows into a cell stack and produces a battery voltage that powers the fuze electronics.

Figure 2:
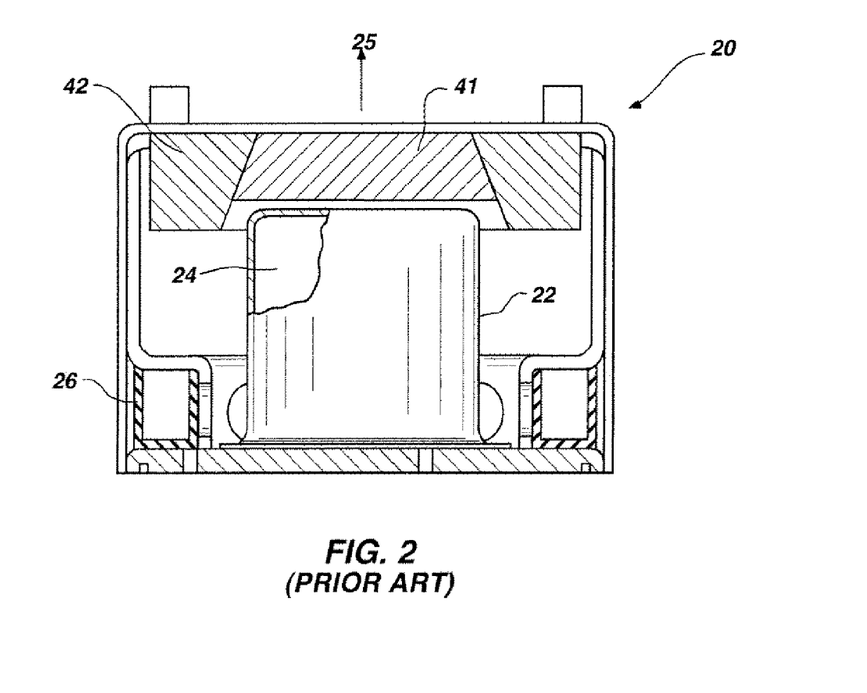
FIG. 2 is a cross-sectional illustration of a conventional reserve battery assembly within a fuze.

FIG. 2 illustrates a conventional reserve battery assembly 20 that includes a reservoir 22 with a liquid electrolyte 24 contained therein, and a voltage producing cell stack 26. Upon launch of a projectile, inner and outer drive disks 41, 42, respectively, are moved by the acceleration forces (shown by arrow 25) and, in doing so, reservoir 22 is crushed and the electrolyte 24 is forced into cell stack 26 producing a voltage that powers an electronics module of a projectile fuze during flight. Problems associated with reserve batteries include long delay times for fuze power-up and the use of toxic materials and expensive components. Additionally, the force required to break the glass ampoule may be inconsistent, thus resulting in inconsistent unit-to-unit output energy characteristics.

Setback generators, which are also used as power sources for projectile fuzes, generate a pulse of electricity when a projectile is fired and rapidly accelerates down a launch barrel. The pulse of electricity charges a capacitor and the energy stored in the capacitor is then used to power the fuze electronics.

Figure 3:
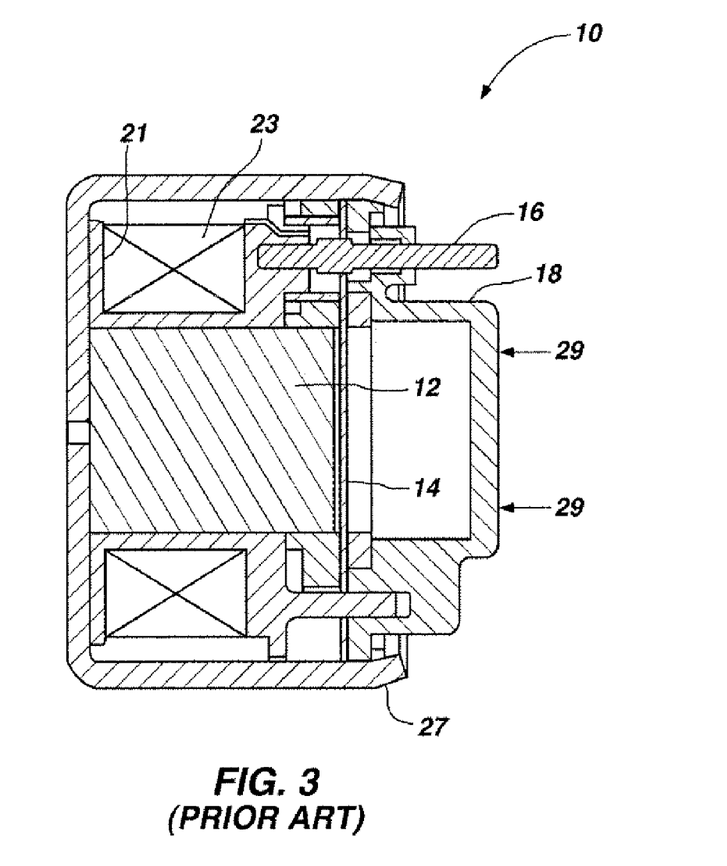
FIG. 3 is a cross-sectional illustration of a conventional setback generator within a fuze.

FIG. 3 illustrates a conventional setback generator 10 that comprises a base cup 27, a top cap 18 and an inner frame 21 that contains a woven coil 23. A magnet 12 fits within inner frame 21 and rests against the base cup 27. The magnet 12 is initially held against the base cup 27 by a thin shear disc 14. Upon the firing of a projectile, setback generator 10 is subjected to a rapid acceleration (shown by arrows 29), which causes magnet 12 to shear through shear disc 14 and move to the right (as the drawing is oriented) until it rests against the top cap 18 of the setback generator 10 assembly. This sudden movement of the magnet 12 causes the magnetic field within the setback generator 10 to decrease, which then induces a current within coil 23. Terminal post 16 conducts the induced current away from the setback generator 10 and a corresponding voltage charges a capacitor, which powers an electronics module of the fuze during flight.

Like reserve batteries, conventional setback generators suffer from high unit-to-unit variances during setback as a result of unpredictable shearing properties of any shear disc design. Conventional setback generators using a shear disc design have high ductility and thickness tolerance properties, which may cause the setback generator to experience effects of friction on the periphery of the magnet against the shear disc edges upon shearing. Additionally, setback generators implementing a shear disc design may also experience plastic deformation and stretching of the discs upon setback, rather than a complete shear of the discs. As a result, the shear disc design suffers from high unit-to-unit output variances during projectile setback. Conventional setback generators also suffer from low energy output as well as from slow response times due to inefficient magnetic circuits. Additionally, conventional setback generators have a high unit product cost due to complex component parts, and lack packaging flexibility within the fuze.

There is a need for methods and apparatuses that simplify, improve the performance of, and increase the speed of setback generators, all while reducing the unit product cost of fuze power sources.

BRIEF SUMMARY OF THE INVENTION

An embodiment of the present invention comprises a setback generator power supply comprising a stator assembly including a coil and an armature assembly including a magnet disposed therein. The armature assembly has a first side, and a second side that is spaced therefrom along the axis relative to the first side. The setback generator power supply further includes a fastener that extends substantially from the first side of the armature assembly toward the second side of the armature assembly through the magnet received within the armature assembly and is configured to be sheared by a launch force of a projectile incorporating the setback generator power supply. The armature assembly is displaced upon the shearing of the fastener, responsive to which displacement of the armature assembly a current is induced in a coil of the stator assembly that surrounds the magnet.

Another embodiment of the present invention includes a method of generating power in a projectile faze comprising providing a magnet contained within an armature assembly of a setback generator. The armature assembly is coupled to the stator assembly by a fastener extending substantially from a first side of the armature assembly to a second side of the armature assembly. The method further includes shearing the fastener using a force of a projectile launch and displacing the armature assembly to generate a current in a surrounding coil of the stator assembly from inductive coupling between the coil and the displaced armature assembly.

Another embodiment of the present invention includes a projectile fuze comprising fuze electronics and a setback generator power supply according to an embodiment of the present invention.

Another embodiment of the present invention includes an explosive projectile comprising an encasement, an explosive material disposed within the encasement and configured for detonation. Additionally, the explosive projectile includes a fuze disposed within the encasement comprising faze electronics and a setback generator power supply according to an embodiment of the present invention.

Yet another embodiment of the present invention includes a method of making a setback generator comprising selecting a magnet with a potentially suitable diameter given a size constraint of the setback generator, wherein the magnet has sufficient length to drive a magnetic flux around a magnetic circuit linked to a coil. The method further includes selecting the coil comprising a number of windings for a desired output voltage, and determining the output voltage of the setback generator. The method further includes varying the selected magnet diameter within the size constraint to achieve an optimized output energy.

DETAILED DESCRIPTION OF THE INVENTION

The present invention, in various embodiments, comprises apparatuses and methods of operation for a fuze setback generator power source that simplify a shearing mechanism employed in the generator, increase the speed of generation and magnitude of the output energy, and reduce the unit product cost of the power source.

In the following description, circuits and functions may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

In describing embodiments of the present invention, the systems and elements incorporating embodiments of the invention are described to better understand the function of the described embodiments of the invention as it may be implemented within these systems and elements.

Figure 4:
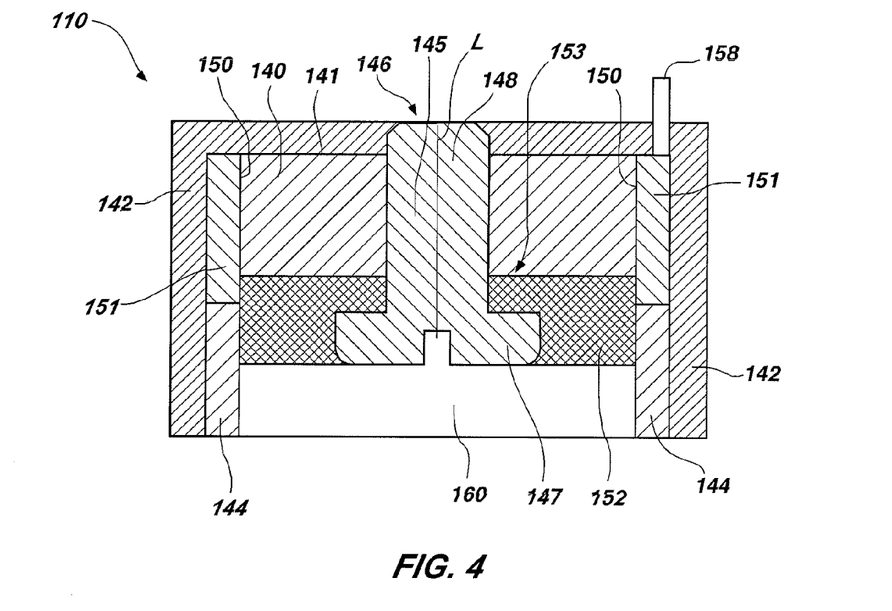
FIG. 4 is a cross-sectional view of a setback generator in a pre-launch position in accordance with an embodiment of the invention.

FIG. 4 illustrates a setback generator power source 110 in a pre-launch position which operates on a moving magnet principle during setback of a cannon-fired projectile fuze, the term "cannon" as used herein encompassing any and all apparatus for throwing a projectile using force of a controlled detonation of explosive material within a confined space to launch a projectile from a gun barrel. Setback generator 110 provides for, as described in detail below, a simple shearing mechanism, a minimal amount of component parts, component parts of simplified design, and a high level of magnetic efficiency. Setback generator 110 includes an elongated fastener 146 with a first end portion 148, a middle portion 145 and an enlarged, second end portion 147 comprising a head. Fastener 146 may be any suitable attachment device, such as a screw, bolt, rivet, and the like. For brevity and ease of description, fastener 146 will be referred to herein as a screw. The middle portion 145 of screw 146 is surrounded by magnet 140, which is peripherally encased by a bobbin assembly 150 and stator ring 144. The stator ring 144, bobbin assembly 150, armature disk 152, first end portion 148 of screw 146 and a top portion 141 of magnet 140 are all substantially surrounded by a stator cup 142 (also referred to as a housing). The armature disc 152 peripherally surrounds the second end portion 147 of screw 146 and is longitudinally slidably movable, but for the constraint provided by screw 146, with respect to the stator cup 142, stator ring 144 and bobbin assembly 150. In addition, armature disc 152 includes a recessed shoulder 153 abutting end portion 147 of screw 146 and configured to secure magnet 140 to armature disc 152. Recessed shoulder 153 provides a safety feature by ensuring that armature disc 152 does not separate from magnet 140 and, therefore, demagnetize magnet 140 prematurely. Bobbin assembly 150 includes coil 151 wound therein, and an output terminal 158 which extends though the wall of stator cup 142 and may be used to conduct an electrical pulse from setback generator 110. The ferromagnetic components of setback generator 110 make up a magnetic circuit which includes the magnet 140, stator cup 142, stator ring 144, and armature disc 152. Setback generator 110 also includes an air gap 160 that exists outside of the magnetic circuit. Magnet 140, screw 146 and armature disc 152 may together be referred to as an armature assembly and stator ring 144, stator cup 142, and coil 151 may together be referred to as a stator assembly.

For example, and without limitation, magnet 140 may be an Alnico 5 alloy magnet which comprises primarily aluminum, nickel, and cobalt. Alnico 5 alloy magnets exhibit a high flux density (amount of flux over a given area) and a low coercive force or demagnetizing force. As a result, demagnetization of an Alnico 5 alloy magnet is achieved quickly and easily. Although an Alnico 5 alloy magnet is disclosed for use in the described embodiment, the use of any type of permanent magnet is contemplated as within the scope of the invention. Additionally, screw 146 may be, for example only, and not limitation, a simple polymer screw such as a polyetheretherketone (PEEK) screw.

After initial assembly of setback generator 110, magnet 140 may be magnetized in situ. Magnetization of magnet 140 may be enhanced by first lowering the reluctance of the magnetic circuit as described in the preceding paragraph by decreasing any low permeability air gaps in the flux path which may cause flux leakage of the magnetic circuit. Additionally, the armature disc 152 and stator ring 144 function to reduce flux leakage and saturation effects of the magnetic circuit. After lowering the reluctance of the magnetic circuit, the magnetic circuit is magnetized by means of a capacitive discharge magnetizer.

Figure 5:
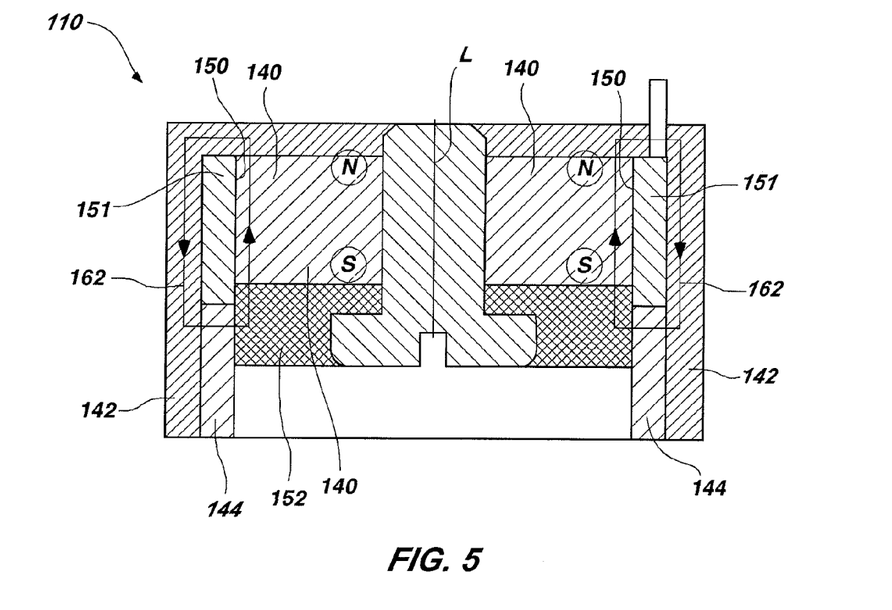
FIG. 5 is a cross-sectional view of a setback generator in a pre-launch position illustrating a magnetic flux path in accordance with the embodiment of FIG. 4.

FIG. 5 illustrates setback generator 110 in a pre-launch position after magnetization, illustrating the magnetic flux path 162 of the magnetic circuit within setback generator 110. The armature disc 152, stator ring 144 and stator cup 142 make up the magnetic flux return path and direct the lines of flux around coil 151 within bobbin assembly 150. The magnetic flux path 162 travels from the north pole N of magnet 140, along and down the stator cup 142, through the stator ring 144 and armature disc 152, into magnet 140 at the south pole S, and back to the north pole N through the inside of magnet 140.

Figure 6:
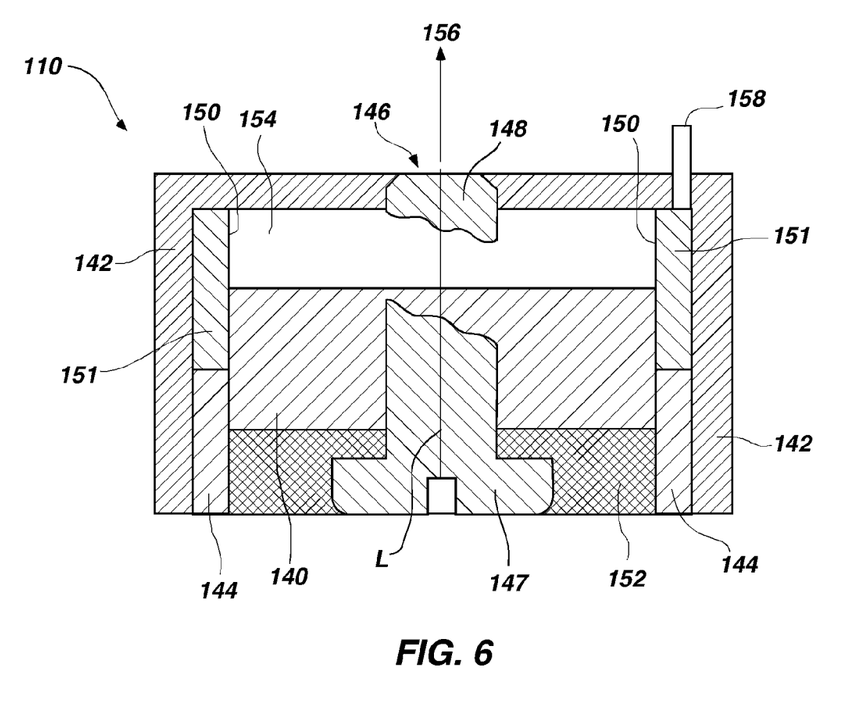
FIG. 6 is a cross-sectional view of a setback generator in a post-launch position in accordance with the embodiment of FIG. 4.

FIG. 6 illustrates setback generator 110 in a post-launch position. Upon the firing of the projectile containing it, setback generator 110 is subjected to a rapid acceleration (shown by arrow 156). After projectile launch, at a point on a g-force versus time curve (see FIG. 7), the mass of the magnet 140 shears the first end portion 148 of the screw 146 from middle portion 145 (see FIG. 4) and second end portion 147 of screw 146 responsive to the acceleration force. Shearing of screw 146 may be defined as a tensile failure of the screw 146 in a direction substantially perpendicular to the longitudinal axis L of the screw 146. This shearing process enables displacement of magnet 140 under the acceleration and creates an air gap 154 within the coil 151 that extends across the diameter of magnet 140. The increased air gap reluctance due to air gap 154 causes the magnetic flux density to go from high to low and results in demagnetization of magnet 140. Demagnetization of magnet 140 induces a current in the surrounding coil 151 by virtue of the collapsing magnetic field. Subsequently, output terminal 158 conducts a voltage, corresponding to the induced current, away from setback generator 110 through rectifier 28 and into electrical storage device 30 (see FIG. 8). As a result, the induced current produces a voltage that is stored in electrical storage device 30, which then is used to power the fuze electronics 132 during projectile flight. For brevity and ease of description, electrical storage device 30 will be referred to herein as a capacitor.

As opposed to conventional setback generator designs, the distance between magnetic poles of magnet 140 is less or, in other words, the length of magnet 140 is shorter. A shorter magnet requires less of an air gap in order to demagnetize the magnet, which results in a greater rate of change of the magnetic flux with respect to time. Quicker demagnetization of magnet 140 results in a response time in which the fuze electronics receives power that may be many orders of magnitude faster than when a reserve battery is employed. By way of nonlimiting example only, operation of setback generator 110 may provide a response time of approximately 100 microseconds. The increased response time enables "in-tube" activation of the fuze electronics for sating and arming circuit processing. Stated another way, due to the faster response time provided by setback generators according to embodiments of the present invention, the safing and arming module may receive power from the setback generator and be activated before a projectile has exited the barrel of a cannon or any other similar projectile launching device.

Additionally, due to a better balance of component parts in comparison to conventional setback generators, including an improved parametric relationship of the magnetic volume, copper volume, and the magnetic circuit volume, the setback generator embodied by the present invention exhibits lower loss and provides increased energy output power per unit volume. To achieve a preferred parametric relationship between the magnetic volume, copper volume, and magnetic circuit volume an optimization process may be carried out. The optimization process includes maximizing the magnetic flux by using an Alnico 5 alloy magnet with the largest possible diameter provided the given size constraints of stator cup 142, stator ring 144 and armature disc 152 which, in turn, are governed by the diameter of the projectile in which setback generator 110 is to be used. Also, a sufficient magnetic length must be provided to drive the magnetic flux around the magnetic circuit. For the given stator and armature disc dimensions, a coil with a selected number of windings may then be chosen to provide a desired output voltage. If excessive winding resistance is encountered, or insufficient output voltage results from the available size and volume constraints, the magnet diameter may be varied until an optimized output energy is realized. This design process can be accomplished using hand calculations or computer-aided design (CAD) modeling.

The shearing process of setback generator 110 is simplified by using only a minimal number of low-cost component parts, in the form of a single fastener 146, configured, by way of example only, as a screw. As opposed to conventional setback generators, setback generator 110 offers a high level of predictability and repeatability due to the simplicity and precision of the configuration and the material consistency of screw 146. The shearing process is further simplified by employing only two moving parts within the magnetic circuit, including the magnet 140 and armature disc 152. The lower ductility and thickness tolerance properties of the shear screw design, as opposed to the shear disc design of conventional setback generators, contributes to lower unit-to-unit output variances during projectile setback. In all, using fewer parts, which are simplified in design and more consistent in dimensions and material properties, results in a simplified shearing mechanism that provides better controlled shearing properties, more consistent unit-to-unit output characteristics, and lower per-unit product costs.

Figure 7:
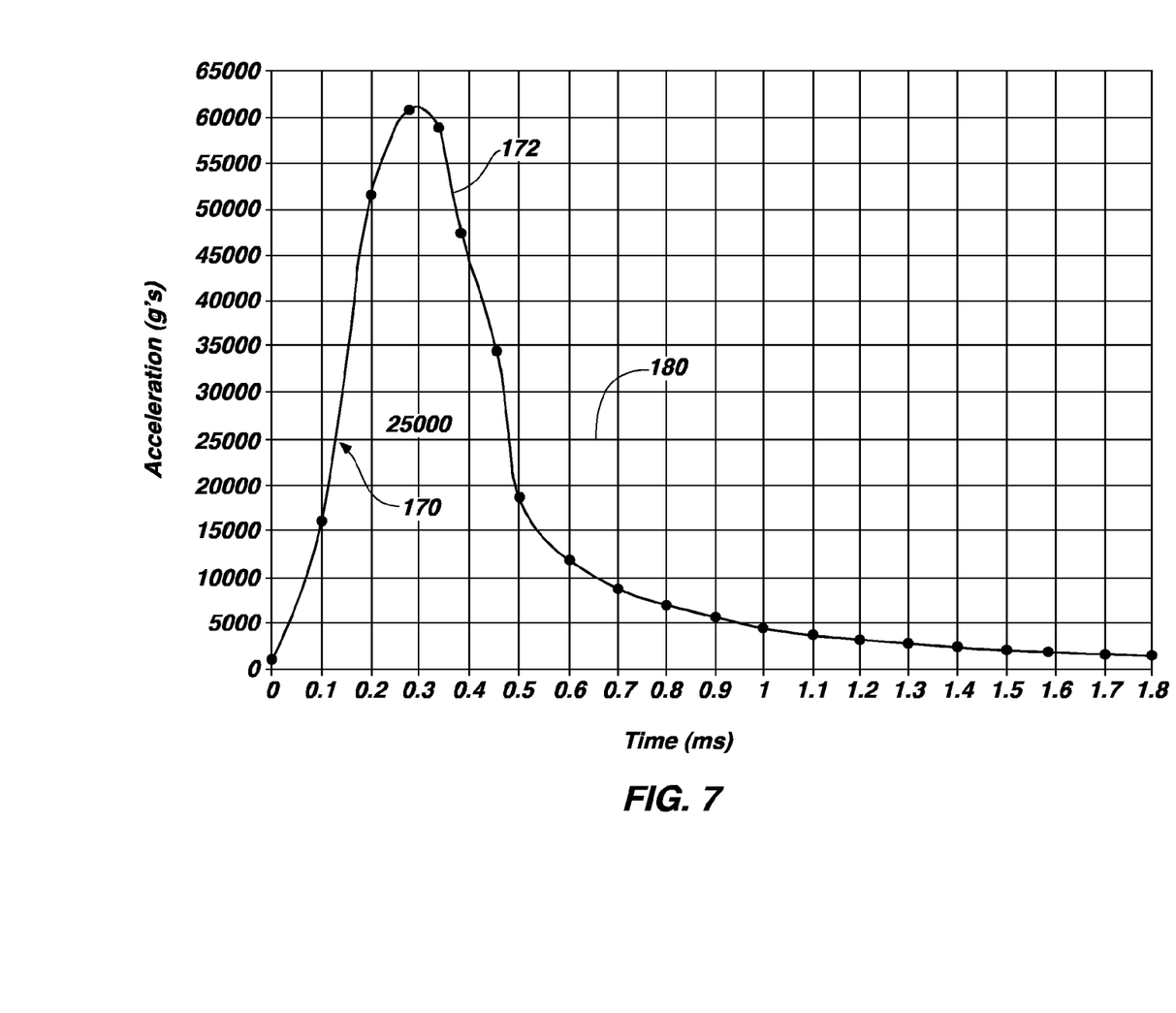
FIG. 7 is a g-force versus time plot illustrating a shearing point of a fastener as used in an embodiment of a setback generator in accordance with an embodiment of the invention.

FIG. 7 is a g-force versus time curve illustrating projectile launch data and the shearing point of screw 146 (FIGS. 4-6). G-forces of a projectile, including a setback generator contained therein, are represented by curve 172 and a shearing point is represented by line 180 at an acceleration value of 25,000 g-forces. As shown, the shear point 170 of screw 146 is approximately 25,000 g-forces at a time of approximately 0.13 milliseconds from initiation of projectile movement during launch. The time/acceleration relationship depicted in FIG. 7 is only an example of operation of an embodiment of the present invention and by no means limits any embodiment thereof.

Figure 8:
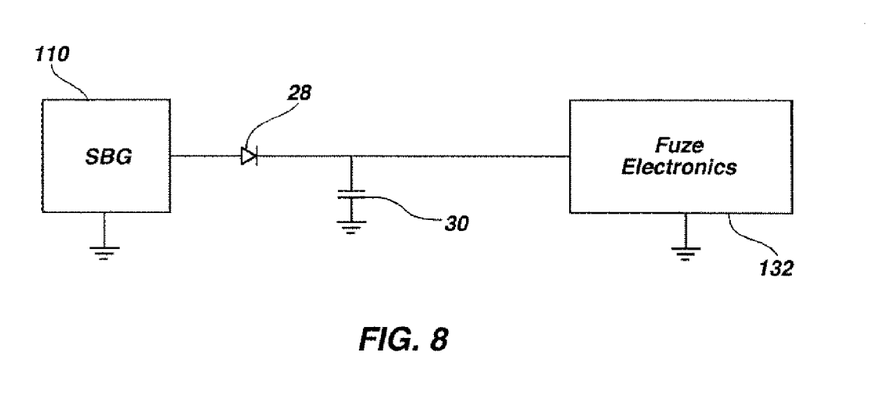
FIG. 8 is a circuit schematic of a portion of a fuze embodying a setback generator in accordance with an embodiment of the invention.

FIG. 8 is a schematic of a circuit connection of setback generator (SBG) 110 and fuze electronics 132. As described above, upon projectile launch and responsive to acceleration forces, setback generator 10 provides an electrical pulse via output terminal 158 (FIGS. 4-6) through rectifier 28 and a corresponding voltage is stored in capacitor 30. Capacitor 30 is operably coupled to fuze electronics 132 and the energy stored in capacitor 30 is used to power fuze electronics 132 during projectile flight. The circuit configuration illustrated in FIG. 8 is used only as an example of one suitable circuit connection between setback generator 110 and fuze electronics 132, and other configurations are encompassed within the scope of the invention.

Figure 9:
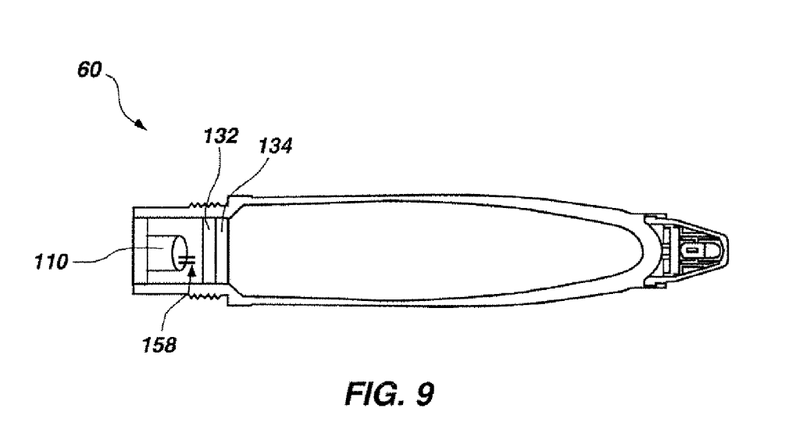
FIG. 9 is an illustration of an explosive projectile containing a fuze and a setback generator in accordance with an embodiment of the invention.

FIG. 9 illustrates a setback generator 110 including an aft loading configuration and forward-based electrical output terminal 158 which results in greater packaging flexibility of the flue electronics 132. Setback generator 110 is configured to allow the setback generator 110 to be located in the back, or aft end, of projectile 60 with the more sensitive devices, including the fuze electronics 132 and the safing and arming module 134, to be on top of or in front of setback generator 110. Output terminal 158 is located at the front, or forward end, of setback generator 110 and extends in the same direction as a projectile launch. The aft loading configuration along with the forward-based electrical output terminal 158 enables easier assembly and simplified routing of power to fuze electronics 132. However, while the aft location for the setback generator 110 is used in FIG. 9, other locations and configurations are contemplated within the scope of the invention.

Whereas one design and size of an embodiment of setback generator 110 may be employed with a number of different flues, within the scope of the present invention, the configuration of the setback generator embodied in the present invention may be rescaled to provide a range of output energy levels for significantly different fuze applications and sizes.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. A setback generator power supply, comprising:
a stator assembly including a coil;
an armature assembly including a magnet disposed therein and having a first side and a second side spaced from the first side; and
an elongated fastener extending substantially from the first side of the armature assembly toward the second side thereof and in a perpendicular orientation with respect to the first side and the second side, wherein the elongated fastener is configured to be sheared by a force of a projectile launch applied along an axis perpendicular to each of the first side and the second side and parallel to a longitudinal axis of the elongated fastener;
wherein the armature assembly is configured for movement in a direction parallel to the axis and constrained against the movement by the elongated fastener.

2. The setback generator power supply of claim 1, wherein the magnet comprises an Alnico 5 alloy magnet.

3. The setback generator power supply of claim 1, wherein the elongated fastener comprises a polyetheretherketone (PEEK) screw.

4. The setback generator power supply of claim 1, further comprising an output terminal operably coupled to the coil and configured for routing a voltage induced therein by displacement of the magnet to an electrical storage device.

5. The setback generator power supply of claim 4, further comprising an electrical storage device operably coupled to the output terminal.

6. The setback generator power supply of claim 5, wherein the electrical storage device comprises a capacitor.

7. The setback generator power supply of claim 4, wherein the output terminal extends in a direction parallel to the axis.

8. The setback generator power supply of claim 1, wherein the power supply is configured to provide a response time of substantially 100 microseconds.

9. The setback generator power supply of claim 1, wherein the armature assembly further includes an armature disc adjacent the magnet and comprising a recessed shoulder configured to abut an end portion of the elongated fastener to secure the armature disc to the magnet.

10. A method of generating power in a projectile faze, comprising:
maintaining a magnet within a coil using an elongated fastener extending through the magnet;
applying an acceleration force along a longitudinal axis of the elongated fastener to shear the elongated fastener and permit displacement of the magnet responsive to the acceleration force; and
generating a current in the coil responsive to displacement of the magnet through inductive coupling therebetween.

11. The method of claim 10, further comprising charging an electrical storage device with a voltage associated with the current induced by displacement of the magnet.

12. The method of claim 11, further comprising powering electronics of a fuze using a charge stored within the electrical storage device.

13. The method of claim 10, further comprising magnetizing the magnet in situ after assembly of a setback generator comprising the magnet.

14. The method of claim 13, wherein magnetizing the magnet comprises magnetizing the magnet with a capacitive discharge magnetizer.

15. The method of claim 13, wherein magnetizing the magnet comprises magnetizing the magnet as it is maintained within the coil.

16. A projectile fuze, comprising:
fuze electronics; and
a setback generator power supply comprising:
a stator assembly including a coil;
an armature assembly including a magnet disposed therein and having a first side and a second side spaced from the first side; and
an elongated fastener extending substantially from the first side of the armature assembly toward the second side thereof and in a perpendicular orientation with respect to the first side and the second side, wherein the elongated fastener is configured to be sheared by a force of a projectile launch applied along an axis perpendicular to each of the first side and the second side and parallel to a longitudinal axis of the elongated fastener;
wherein the armature assembly is configured for movement in a direction parallel to the axis and constrained against the movement by the elongated fastener.

17. The projectile fuze of claim 16, wherein the magnet comprises an Alnico 5 alloy magnet.

18. The projectile fuze of claim 16, wherein the elongated fastener comprises a polyetheretherketone (PEEK) screw.

19. The projectile fuze of claim 16, further comprising an output terminal operably coupled to the coil and configured for routing a voltage induced therein by displacement of the magnet to an electrical storage device.

20. The projectile fuze of claim 19, further comprising an electrical storage device operably coupled to the output terminal.

21. The projectile fuze of claim 19, wherein the electrical storage device comprises a capacitor.

22. The projectile fuze of claim 19, wherein the output terminal extends in a direction parallel to the axis.

23. The projectile fuze of claim 16, wherein the power supply is configured to provide a response time of substantially 100 microseconds.

24. The projectile fuze of claim 16, wherein the armature assembly further includes an armature disc adjacent the magnet and comprising a recessed shoulder configured to abut an end portion of the elongated fastener to secure the armature disc to the magnet.

25. An explosive projectile, comprising:
an encasement having a forward end and an aft end;
an explosive material disposed within the encasement and configured for detonation; and
a fuze operably coupled with the explosive material, comprising:
fuze electronics; and
a setback generator power supply comprising:
a stator assembly including a coil;
an armature assembly including a magnet disposed therein and having a first side and a second side spaced from the first side; and
an elongated fastener extending substantially from the first side of the armature assembly toward the second side thereof and in a perpendicular orientation with respect to the first side and the second side, wherein the elongated fastener is configured to be sheared by a force of a projectile launch applied along an axis perpendicular to each of the first side and the second side and parallel to a longitudinal axis of the elongated fastener;
wherein the armature assembly is configured for movement in a direction parallel to the axis and constrained against the movement by the elongated fastener.

26. The explosive projectile of claim 25, wherein the magnet comprises an Alnico 5 alloy magnet.

27. The explosive projectile of claim 25, wherein the elongated fastener comprises a polyetheretherketone (PEEK) screw.

28. The explosive projectile of claim 25, further comprising an output terminal operably coupled to the coil and configured for routing a voltage induced therein by displacement of the magnet to an electrical storage device.

29. The explosive projectile of claim 28, further comprising an electrical storage device operably coupled to the output terminal.

30. The explosive projectile of claim 28, wherein the electrical storage device comprises a capacitor.

31. The explosive projectile of claim 28, wherein the output terminal comprises a forward-based configuration.

32. The explosive projectile of claim 25, wherein the power supply is configured to provide a response time of substantially 100 microseconds.

33. The explosive projectile of claim 25, wherein the armature assembly further includes an armature disc adjacent the magnet and comprising a recessed shoulder configured to abut an end portion of the elongated fastener to secure the armature disc to the magnet.

34. A method of making a setback generator, comprising:
selecting an interior diameter for a coil of an armature assembly;
selecting a magnet with a potentially suitable outer diameter for disposition within the coil, given a size constraint provided by the selected interior diameter of the coil, and a sufficient length for the magnet to drive a magnetic flux around a magnetic circuit;
positioning an elongated fastener through the magnet to maintain the magnet within the coil;
selecting a coil exhibiting the selected interior diameter and comprising a selected number of windings to provide a desired output voltage from the setback generator;
determining an output voltage generated by displacement of the magnet with respect to the coil; and
varying the selected potentially suitable magnet outer diameter within the size constraint to achieve an optimized output energy, including the desired output voltage.

* * * * *

UNITED STATES PATENT AND TRADEMARK OFFICE
CERTIFICATE OF CORRECTION

PATENT NO.         : 7,669,532 B2
APPLICATION NO.    : 11/560991
DATED              : March 2, 2010
INVENTOR(S)        : Scott D. Crist et al.

It is certified that error appears in the above-identified patent and that said Letters Patent is hereby corrected as shown below:

COLUMN 1, LINE 29, change "faze" to --fuze--
COLUMN 2, LINE 47, change "faze" to --fuze--
COLUMN 2, LINE 65, change "faze" to --fuze--
COLUMN 5, LINE 53, change "sating" to --safing--
COLUMN 6, LINE 52, change "10" to --110--
COLUMN 6, LINE 65, change "flue" to --fuze--
COLUMN 7, LINE 14, change "flues," to --fuzes,--

CLAIM 10, COLUMN 8, LINE 1, change "faze," to --fuze,--

Signed and Sealed this
Thirteenth Day of September, 2011

David J. Kappos
*Director of the United States Patent and Trademark Office*